(12) United States Patent
Tzeng et al.

(10) Patent No.: US 11,836,875 B2
(45) Date of Patent: *Dec. 5, 2023

(54) AUGMENTED REALITY SCREEN SYSTEM AND AUGMENTED REALITY SCREEN DISPLAY METHOD

(71) Applicant: Acer Incorporated, New Taipei (TW)

(72) Inventors: Huei-Ping Tzeng, New Taipei (TW); Chao-Kuang Yang, New Taipei (TW); Wen-Cheng Hsu, New Taipei (TW); Chih-Wen Huang, New Taipei (TW); Chih-Haw Tan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/711,192

(22) Filed: Apr. 1, 2022

(65) Prior Publication Data

US 2022/0230403 A1 Jul. 21, 2022

Related U.S. Application Data

(63) Continuation of application No. 17/183,488, filed on Feb. 24, 2021, now Pat. No. 11,328,493.

(30) Foreign Application Priority Data

Aug. 10, 2020 (TW) .................. 109127010

(51) Int. Cl.
*G06T 19/00* (2011.01)
*G06T 7/70* (2017.01)
*G06T 7/20* (2017.01)

(52) U.S. Cl.
CPC .............. *G06T 19/006* (2013.01); *G06T 7/20* (2013.01); *G06T 7/70* (2017.01); *G06T 2207/30204* (2013.01)

(58) Field of Classification Search
CPC .......... G06T 19/006; G06T 7/20; G06T 7/70; G06T 15/20; G06T 2207/30204; G06T 7/74

See application file for complete search history.

(56) References Cited

U.S. PATENT DOCUMENTS

| | | | |
|---|---|---|---|
| 9,384,594 B2 | 7/2016 | Maciocci et al. | |
| 10,310,265 B2* | 6/2019 | Giwnewer | G06F 3/011 |

(Continued)

FOREIGN PATENT DOCUMENTS

| | | |
|---|---|---|
| CN | 103460255 A | 12/2013 |
| CN | 107004044 A | 8/2017 |

OTHER PUBLICATIONS

Chinese language office action dated Oct. 15, 2021, issued in application No. TW 109127010.

(Continued)

*Primary Examiner* — Jeffery A Brier
(74) *Attorney, Agent, or Firm* — McClure, Qualey & Rodack, LLP (57) ABSTRACT

An augmented reality screen system includes an augmented reality device and a host. The augmented reality device is configured to take a physical mark through a camera. The host is configured to receive the physical mark, determine position information and rotation information of the physical mark, and fetch a virtual image from a storage device through a processor of the host. The processor transmits an adjusted virtual image to the augmented reality device according to the position information and the rotation information, and the augmentation device projects the adjusted virtual image to a display of the augmented reality device. The adjusted virtual image becomes a virtual extended screen, and the virtual extended screen and the physical mark are simultaneously displayed on the display of the augmented reality device.

8 Claims, 6 Drawing Sheets

(56) References Cited

U.S. PATENT DOCUMENTS

| | | | |
|---|---|---|---|
| 11,328,493 B2* | 5/2022 | Tzeng | G06T 7/70 |
| 2001/0044858 A1* | 11/2001 | Rekimoto | G06F 3/011 |
| | | | 710/1 |
| 2012/0032955 A1 | 2/2012 | Matsuda | |
| 2013/0141421 A1 | 6/2013 | Mount et al. | |
| 2015/0243100 A1 | 8/2015 | Abovitz et al. | |
| 2016/0180589 A1 | 6/2016 | Bean et al. | |
| 2017/0131964 A1 | 5/2017 | Baek et al. | |
| 2017/0323062 A1 | 11/2017 | Djajadiningrat et al. | |
| 2019/0096367 A1 | 3/2019 | Yuen et al. | |
| 2020/0286443 A1* | 9/2020 | Collins-Elder | G06V 20/20 |

OTHER PUBLICATIONS

Erwan Normand and Michael J. McGuffin, Enlarging a Smartphone with AR to Create a Handheld VESAD (Virtually Extended Screen-Aligned Display), Oct. 2018, IEEE, 2018 IEEE International Symposium on Mixed and Augmented Reality (ISMAR), pgs. 123-133. (Year: 2018).

* cited by examiner

A camera of a head-mounted display device captures a physical mark —210

A host receives the physical mark, determines position information and rotation information of the physical mark, and retrieves a virtual image from a storage device through a processor of the host —220

The processor adjusts the virtual image according to the position information and the rotation information and transmits the adjusted virtual image to the head-mounted display device, the head-mounted display device projects the adjusted virtual image onto a display HDP of the head-mounted display device, so that the adjusted virtual image becomes a virtual extended screen, the virtual extended screen and the physical mark are simultaneously displayed on the display of the head-mounted display device —230

AUGMENTED REALITY SCREEN SYSTEM AND AUGMENTED REALITY SCREEN DISPLAY METHOD

CROSS REFERENCE TO RELATED APPLICATIONS

This Application is a Continuation of pending U.S. patent application Ser. No. 17/183,488, filed on Feb. 24, 2021, now U.S. Pat. No. 11,328,493, which claims priority of Taiwan Patent Application No. 109127010, filed on Aug. 10, 2020, the entirety of which is incorporated by reference herein.

BACKGROUND OF THE INVENTION

Field of the Invention

The present disclosure relates to augmented reality application, in particular, to an augmented reality screen and an augmented reality screen display method.

Description of the Related Art

At present, extended screens have been widely used in work and daily life. For example, a user can use two screens to expand more windows. However, if users want multiple screens, they need to buy the corresponding number of screens. For example, if a user needs three screens, three screens must be purchased. The more screens, the higher the cost. In addition, the user needs to manually adjust the placement of a screen during the process of configuring the screen.

Therefore, how to conveniently use an extended screen so that the user can see a wider display range has become one of the problems to be solved in this field.

BRIEF SUMMARY OF THE INVENTION

In accordance with one feature of the present invention, the present disclosure provides an augmented reality screen system. The augmented reality screen system includes an augmented reality device and a host. The augmented reality device is configured to take a physical mark through a camera. The host is configured to receive the physical mark, determine position information and rotation information of the physical mark, and fetch a virtual image from a storage device through a processor of the host. The processor transmits an adjusted virtual image to the augmented reality device according to the position information and the rotation information, and the augmentation device projects the adjusted virtual image to a display of the augmented reality device, the adjusted virtual image becomes a virtual extended screen, and the virtual extended screen and the physical mark are simultaneously displayed on the display of the augmented reality device.

In accordance with one feature of the present invention, the present disclosure provides an augmented reality screen display method. The augmented reality screen display method includes taking a physical mark through a camera of an augmented reality device; receiving the physical mark; determining position information and rotation information of the physical mark; and fetching a virtual image from a storage device through a processor of a host; wherein the processor transmits an adjusted virtual image to the augmented reality device according to the position information and the rotation information, and the augmentation device projects the adjusted virtual image to a display of the augmented reality device, the adjusted virtual image becomes a virtual extended screen, and the virtual extended screen and the physical mark are simultaneously displayed on the display of the augmented reality device.

With the augmented reality screen system and the augmented reality screen display method of the present application, the augmented reality device can scan the physical mark placed at any place or any angle, and the user wearing the augmented reality device can see the virtual extended screen based on the physical mark. The screen size of the virtual extended screen can be adjusted according to the user's requirements, which solves the problems of weight, volume, fixed screen size, space limitation, and inconvenience of portability caused by the use of a physical screen. Therefore, the virtualized display of the extended screen in the augmented reality device can not only replace the physical extended screen, but also create new usage scenarios.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
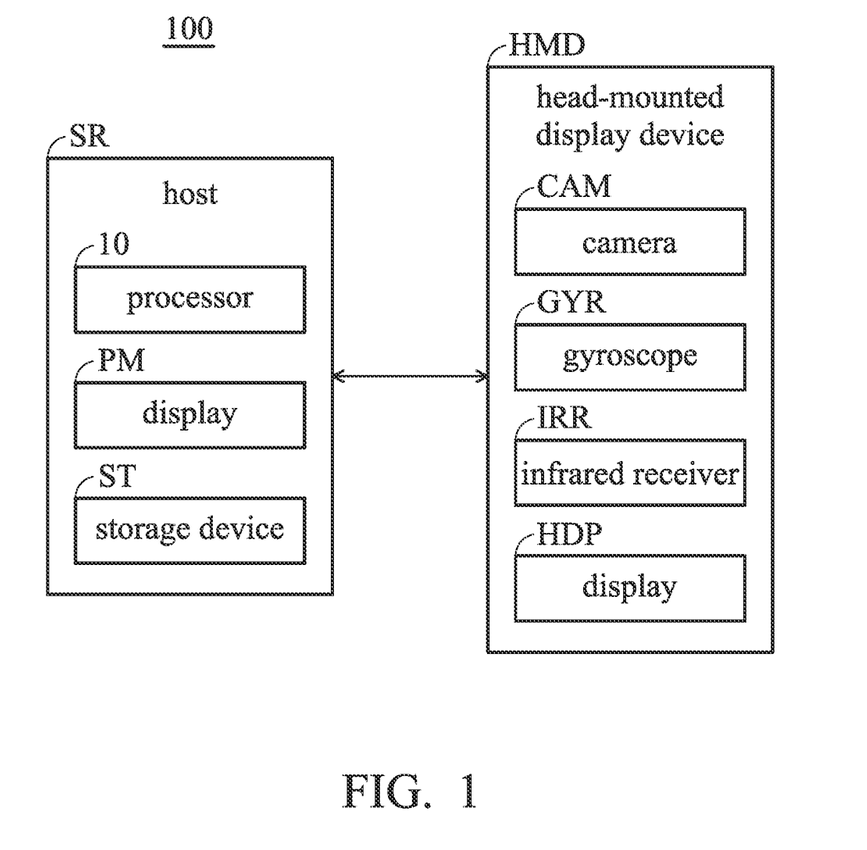
FIG. 1 is a block diagram of an augmented reality screen system in accordance with one embodiment of the present disclosure.
Figure 2:
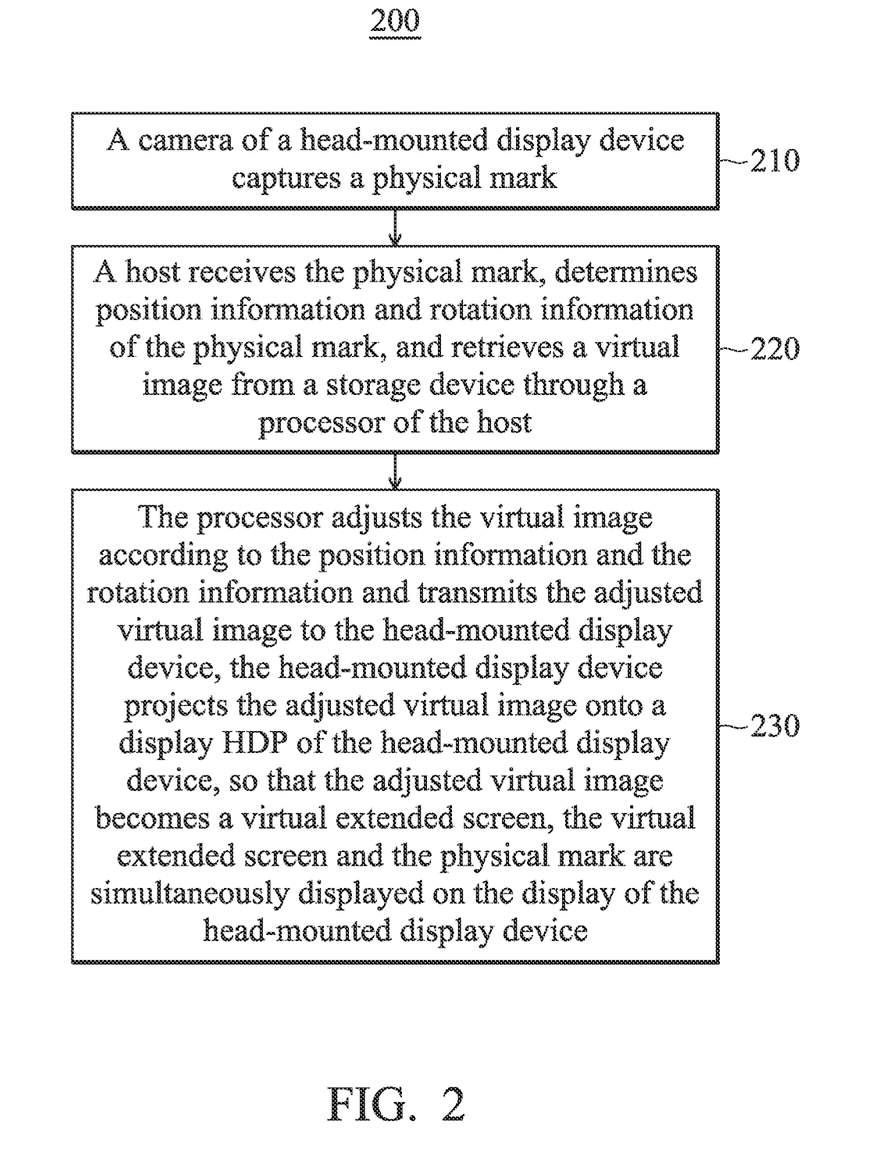
FIG. 2 is a block diagram of an augmented reality screen system in accordance with one embodiment of the present disclosure.
Figure 3:
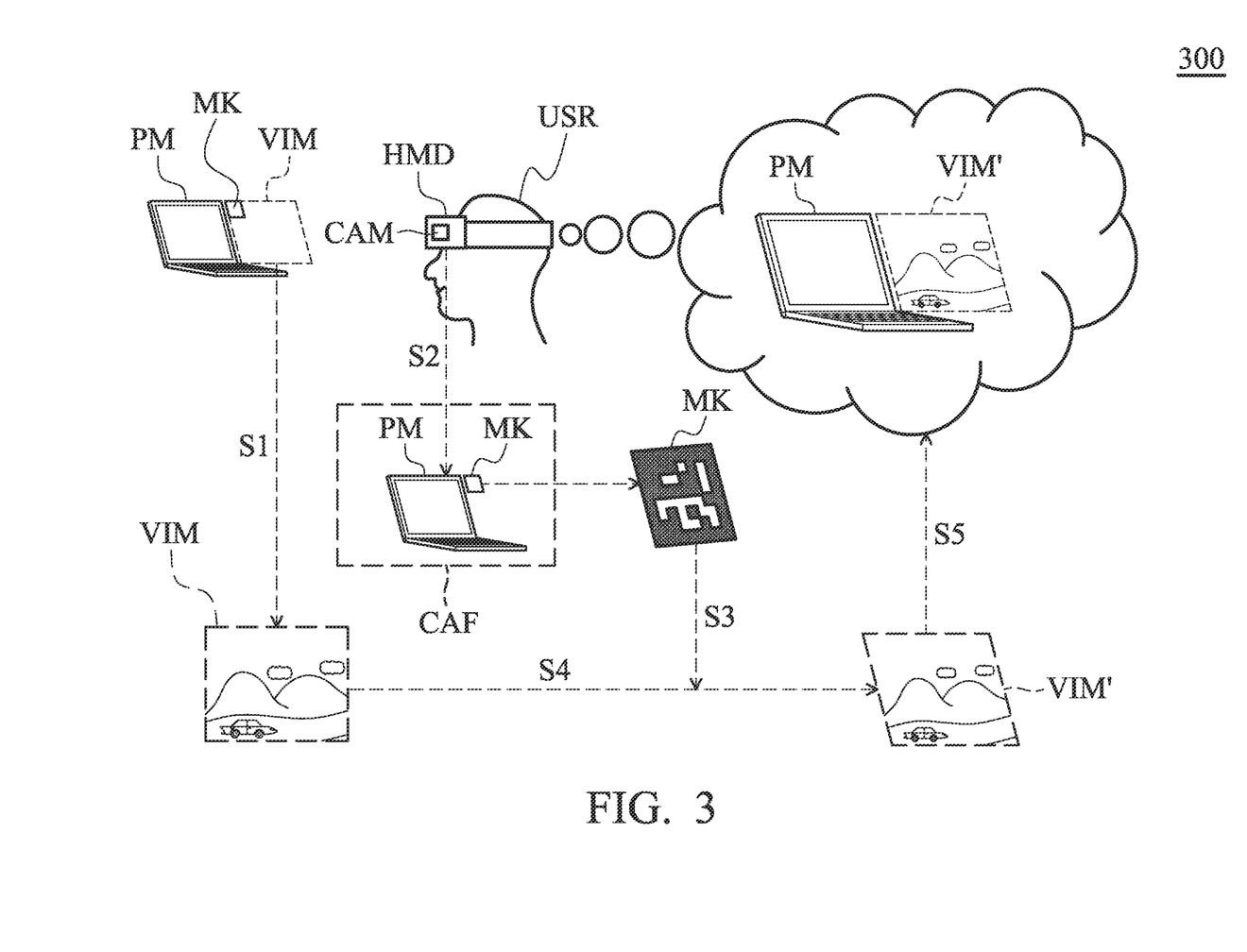
FIG. 3 is a schematic diagram of an augmented reality screen display method in accordance with one embodiment of the present disclosure.

Refer to FIGS. 1-3, FIG. 1 is a block diagram of an augmented reality screen system 100 in accordance with one embodiment of the present disclosure. FIG. 2 is a flowchart of an augmented reality screen display method 200 in accordance with one embodiment of the present disclosure. FIG. 3 is a schematic diagram of an augmented reality screen display method 200 in accordance with one embodiment of the present disclosure.

As shown in FIG. 1, the augmented reality screen system 100 includes a head-mounted display device HMD and a host SR. In one embodiment, the host SR and the head-mounted display device HMD can establish a communication link through a wired or wireless method.

In one embodiment, the augmented reality device may be a head-mounted display device HMD or other devices that can simultaneously display virtual images and physical images. For convenience of description, the head-mounted display device HMD is taken as an example for description.

In one embodiment, the host SR can be a notebook computer, a desktop computer, or other electronic devices with computing functions.

In one embodiment, the host SR includes the processor 10. In one embodiment, the processor 10 can be implemented by using an integrated circuit, such as a microcontroller, a microprocessor, a digital signal processor, an application specific integrated circuit (ASIC), or a logic circuit.

In one embodiment, the host SR can include a display PM or an external display PM. In one embodiment, the display PM is a physical display coupled to the host SR.

In one embodiment, the host SR includes a storage device ST. The storage device ST can be implemented as a read-only memory, a flash memory, a floppy disk, a hard disk, a compact disk, a flash drive, a tape, a network accessible database, or as a storage medium that can be easily considered by those skilled in the art to have the same function.

In one embodiment, the user USR can wear a head-mounted display device HMD. The head-mounted display device HMD includes a camera CAM, a gyroscope GYR, an infrared receiver IRR and a display HDP. The gyroscope GYR can obtain the field of view and direction of the user's USR wearing a head-mounted display device HMD by measuring the angular velocity of the action such as deflection and tilt.

In one embodiment, the camera CAM of the head-mounted display device HMD is used to photograph and track the physical mark MK.

In one embodiment, the physical marker MK can be any form of marker, for example, a binary square marker (ArUco marker), a QR code, an infrared or a screen outward appearance.

In one embodiment, when the augmented reality screen system 100 presets the physical mark MK to be a QR code and the camera CAM captures the QR code, the camera CAM transmits the captured image and the value measured by the gyroscope GYR to the processor 10 of the host SR.

In one embodiment, when the augmented reality screen system 100 presets the physical mark MK to be infrared and the infrared receiver IRR receives the infrared, the infrared receiver IRR transmits the image captured by the camera CAM and the measured value by the gyroscope GYR at this time to the processor 10 of the host SR. It can be seen that through the camera CAM or the infrared receiver IRR, the head-mounted display device HMD can capture the physical mark MK. However, the invention is not limited thereto, as long as the head-mounted display device HMD knows that the physical mark MK has been photographed can be applied.

Please also refer to FIGS. 2 to 3, and the following describes the flow of the augmented reality screen display method 200. The augmented reality screen display method 200 can be implemented by using the components in FIG. 1. In one embodiment, as shown in FIG. 3, the goal is to allow the user USR to see the virtual extended screen VIM displayed next to the display PM (the physical display of the host SR) through the head-mounted display device HMD.

In step 210, a camera CAM of a head-mounted display device HMD captures a physical mark MK.

In one embodiment, when a camera CAM of the head-mounted display device HMD captures the physical mark MK, the captured image CAF and the value measured by the gyroscope GYR are transmitted to the processor 10 of the host SR (that is, the step S2 the FIG. 3). In one embodiment, the frame CAF captured by a camera CAM is a two-dimensional image, and the two-dimensional image includes at least a physical mark MK, in this example, the two-dimensional image also includes the image of a display PM (physical display).

In one embodiment, the host SR can always execute software, such as game software, but does not display the game screen on the display PM (physical display). The game image is temporarily stored in the storage device ST (the storage device here uses memory as an example), and the display PM can be used to display text editing software. After the processor 10 receives the physical mark MK captured by the head-mounted display device HMD, it retrieves the game image VIM from the memory (i.e., the step S1 in the FIG. 3).

In one embodiment, the processor 10 can retrieve the game image VIM from the memory at regular intervals (for example, every 5 seconds). Therefore, There is no sequence between step 1 and step 2 in FIG. 3.

In step 220, a host SR receives the physical mark MK, determines position information and rotation information of the physical mark MK, and retrieves a virtual image VIM from a storage device ST through a processor 10 of the host SR.

In one embodiment, the processor 20 of the host SR receives the frame CAF captured by the camera CAM is a two-dimensional image, and thereby extracts the physical mark MK from the two-dimensional image. The processor 20 analyzes the position information and rotation information of the physical mark MK.

In one embodiment, the position information can be a three-axis coordinates (ax, ay, az) relative to the head-mounted display device HMD, and the rotation information can be a three-axis rotation angle (rx, ry, rz).

In one embodiment, the processor 10 executes a tracking algorithm to detect the position information and rotation information of the physical marker MK. The tracking algorithm can be a known marker tracking method, Visual-Inertial Odometry (VIO) algorithm, Simultaneous Localization and Mapping (SLAM) algorithm or object tracking algorithm to track the position information and the rotation information of the entity marker MK.

In step 230, the processor 10 adjusts the virtual image VIM according to the position information and the rotation information and transmits the adjusted virtual image VIM to the head-mounted display device HMD. The head-mounted display device HMD projects the adjusted virtual image VIM' onto a display HDP of the head-mounted display device HMD, so that the adjusted virtual image VIM' becomes a virtual extended screen. The virtual extended screen VIM' and the physical mark MK are simultaneously displayed on the display HDP of the head-mounted display device HMD.

In one embodiment, since the frame CAF captured by the camera CAM is a three-dimensional image, the physical mark MK extracted from the frame CAF is also a three-dimensional image (shown in the S3 of FIG. 3) and the processor 10 retrieves and calculates the virtual image VIM from the memory is a two-dimensional image, so it is necessary to perform the correction processing of the two-dimensional image projected to the three-dimensional image, so that the display HDP of the head mounted display device HMD can correctly display the adjusted virtual image VIM' (such as shown in the S4 of FIG. 3). When the user USR sees both the virtual image VIM' and the display PM (physical display) through the display HDP of the head-mounted display device HMD, the user USR will visually treat the virtual image VIM' as a virtual extended screen (such as shown in the S5 of FIG. 3).

In one embodiment, the processor 10 calculates target coordinates of each pixel of the virtual image VIM projected to the display HDP of the head-mounted display device HMD through the position projection algorithm, to adjust the virtual image VIM. The processor 10 transmits the adjusted virtual image VIM' to the head-mounted display device HMD, so that the head-mounted display device HMD projects the adjusted virtual image VIM' onto the display HDP of the head-mounted display device HMD.

The following is a method of adjusting the virtual image VIM so that the adjusted virtual image VIM' can be projected to the display HDP of the head-mounted display device HMD. However, the following method is only an example, and other known conversion methods can also be applied.

In one embodiment, the processor 10 reads the physical mark MK information from the head-mounted display device HMD. The physical mark MK information includes position information (ax, ay, az) and rotation information (rx, ry, rz). The processor 10 also receives the image data of the camera CAM, and each pixel is represented by (cx, cu, cz). In addition, the processor 10 obtains the physical mark MK information (position information and rotation information) according to the tracking algorithm, and simultaneously captures the virtual image VIM in the memory.

$$\begin{bmatrix} x_{calib} \\ y_{calib} \\ z_{calib} \\ 1 \end{bmatrix} = \begin{bmatrix} & & & D_{x-axis} \\ & M_{Rotate} & & D_{y-axis} \\ & & & D_{z-axis} \\ 0 & 0 & 0 & 1 \end{bmatrix} \begin{bmatrix} cx \\ cy \\ cz \\ 1 \end{bmatrix}$$

In one embodiment, the processor 10 calibrates the physical mark MK captured by the camera CAM with the projector inside the head-mounted display device HMD as the origin, so as to obtain the relative coordinates with the projector of the head mounted display device HMD as the origin. The calibration function is as follows:

Calibration:

The symbol $M_{Rotate}$ is the relative rotation matrix between the camera CAM and the projector of the head-mounted display device HMD. The symbols $D_{x-axis}$, $D_{y-axis}$ and $D_{z-axis}$ are the three-axis position of the relative translation of the camera CAM and the projector of the head-mounted display device HMD (the origin of the camera CAM is set to the projector of the head-mounted display device HMD as a new origin).

In one embodiment, the processor 10 substitutes the calibrated data Xcalib, Ycalib, and Zcalib into a homography matrix for calculation. The homography matrix is a concept in projective geometry, also known as projective transformation. The homography matrix maps a point on a projective plane to another projective plane, and maps a straight line to a straight line, which has line-preserving properties. The homography matrix function is as follows:

$$\text{Homography:} \begin{bmatrix} x_{Texture} \\ y_{Texture} \\ 1 \end{bmatrix} = \text{Homography} \left( \begin{bmatrix} x_{calib} \\ y_{calib} \\ z_{calib} \\ 1 \end{bmatrix} \right)$$

In this way, the coordinate data after the projective transformation can be obtained.

In one embodiment, the display HDP can be realized by a projector, and the projector is a display used as a companion display in AR world.

In one embodiment, since the field of view (FOV) and resolution of the camera CAM are different from the field of view and resolution of the display HDP (or projector) in the head-mounted display device HMD, the following calculation (cropping FOV range and resizing resolution) for final imaging position adjustment:

Crop and Resize:

$$\begin{bmatrix} x_{proj} \\ y_{proj} \\ 1 \end{bmatrix} = \begin{bmatrix} W_{des}/W_{proj,cam} & 0 & 0 \\ 0 & H_{des}/H_{proj,cam} & 0 \\ 0 & 0 & 1 \end{bmatrix} \begin{bmatrix} 1 & 0 & W_{offset} \\ 0 & 1 & H_{offset} \\ 0 & 0 & 1 \end{bmatrix} \begin{bmatrix} x_{Texture} \\ y_{Texture} \\ 1 \end{bmatrix}$$

wherein, $$W_{offset} = -\frac{W_{cam} - W_{proj,cam}}{2}$$

$$W_{proj,cam} = W_{cam} * \left( \frac{FOV_{proj}}{FOV_{cam}} \right)$$

$$H_{offset} = -\frac{H_{cam} - H_{proj,cam}}{2}$$

$$H_{proj,cam} = H_{cam} * \left( \frac{FOV_{proj}}{FOV_{cam}} \right)$$

The symbols $W_{cam}$ and $H_{cam}$ are respectively the resolution of the width and height of the camera CAM. The symbols $W_{des}$ and $H_{des}$ are the resolutions of the width and height of the virtual screen VIM' (i.e., virtual extended screen), respectively. In one embodiment, the processor 10 displays the calculated virtual extended screen position (dx, dy) on the display HDP of the head-mounted display device HMD. In the augmented reality, the user can see the virtual extended screen with the same rotation angle as the physical marker MK. The processor 10 performs crop and resize matrix operations on the position (dx, dy) of the virtual extended screen to cut and adjust the size of the virtual extended screen.

Figure 4A:
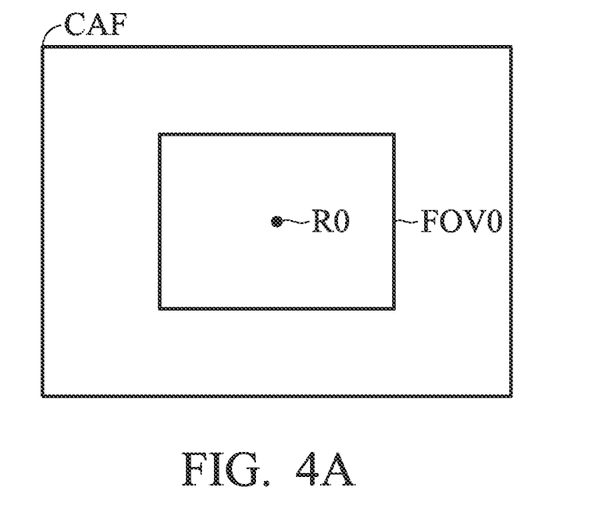
FIGS. 4A to 4C are schematic diagrams of adjusting the field-of-view range in accordance with one embodiment of the present disclosure.
Figure 4B:
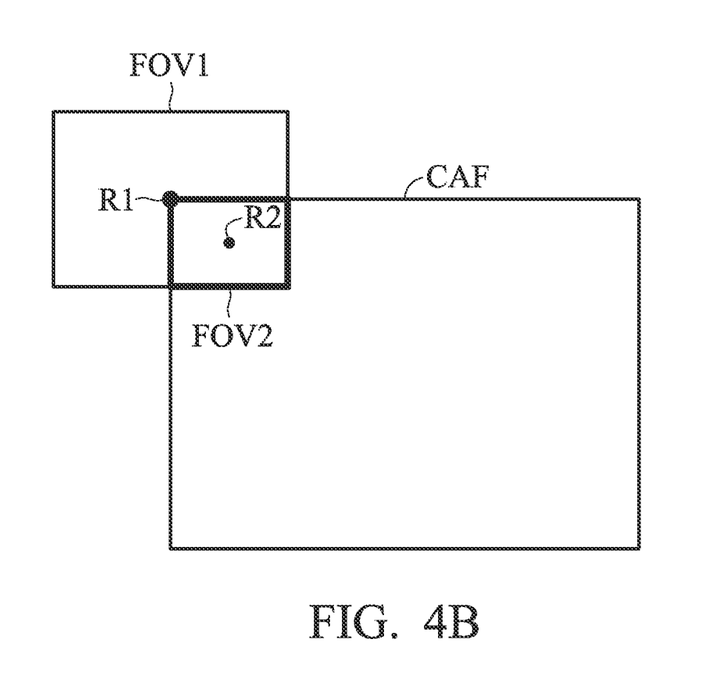
Figure 4C:
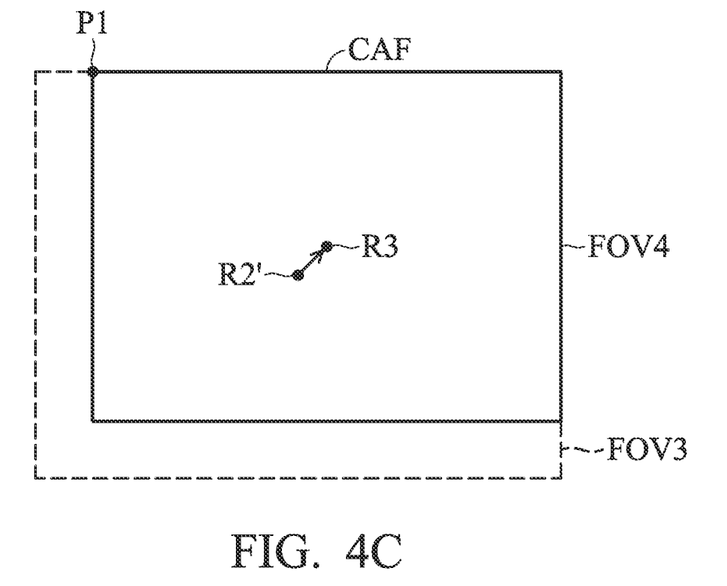
Figure 5:
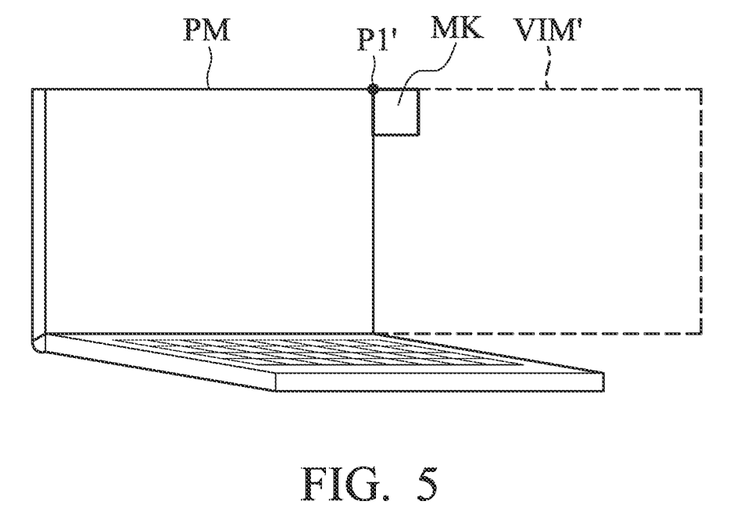
FIG. 5 is a schematic diagram of a virtual extended screen of the head-mounted display device in accordance with one embodiment of the present disclosure.
Figure 6:
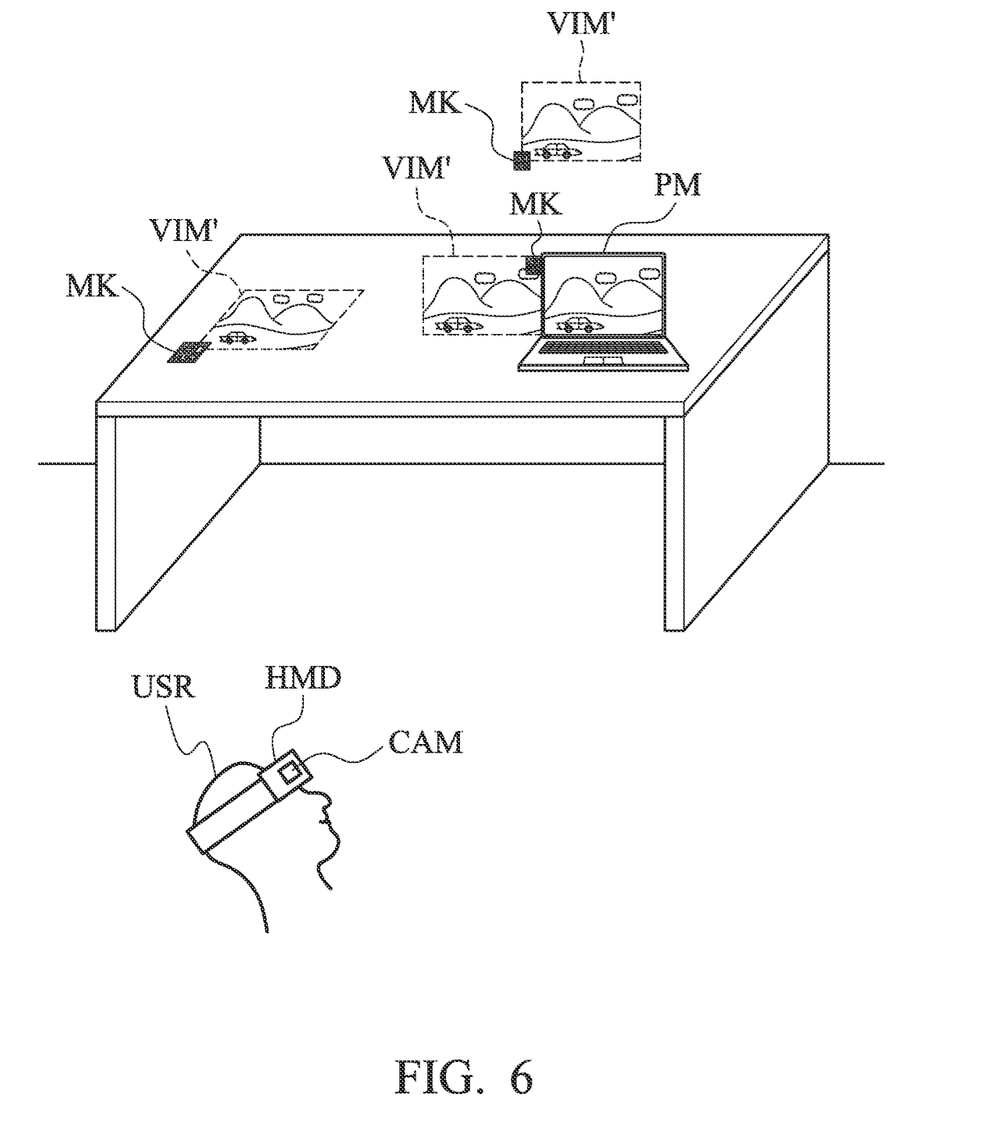
FIG. 6 is a schematic diagram of the application of a virtual extended screen in accordance with one embodiment of the present disclosure.

Please refer to FIGS. 4A to 4C, 5, and 6, and FIGS. 4A to 4C are schematic diagrams of adjusting the field-of-view range in accordance with one embodiment of the present disclosure. FIG. 5 is a schematic diagram of a virtual extended screen of the head-mounted display device HMD in accordance with one embodiment of the present disclosure. FIG. 6 is a schematic diagram of the application of a virtual extended screen in accordance with one embodiment of the present disclosure.

In one embodiment, as shown in FIG. 4A, the processor 10 captures an field-of-view range FOV0 in the frame CAF captured by the camera CAM, selects a reference point R0 from the field-of-view range FOV0, and moves the reference point R0 to a boundary in the frame CAF (for example, in FIG. 4B, the reference point R0 is moved to overlap with the boundary R1, at this time the reference point is regarded as R1 and the field-of-view range is regarded as FOV1).

Next, the processor 10 captures a first specific range of the field-of-view range FOV1 located in the frame CAF (for example, the first specific range FOV2 located in the frame CAF, at this time the designated reference point is R2). The processor 10 enlarges the first specific range FOV2 to be consistent with the resolution of a physical display PM coupled to the host SR (as shown in 4C, the first specific range FOV2 is enlarged to the state of the virtual screen FOV3, so that the resolution of the first specific range FOV2 is consistent with the resolution of the physical display PM. At this time, the designated reference point is shifted from R2 to the position of R2'). The processor 10 moves the reference point R2' to target coordinates R3 on the display HDP of the head-mounted display device HMD (according to the aforementioned position projection algorithm, the processor 10 can calculate the reference point R0 of the camera CAM corresponding to the target position R3 of the display HDP, and move the reference point R2' to the target coordinates R3) at the time. The processor 10 captures a second specific range FOV4 of the field-of-view range located in the virtual frame FOV3, and matches a designated pixel P1 (for example, designated upper left pixel P1) of the second specific range FOV4 to a designated position of the physical mark MK (designated position, such as designated upper left pixel P1' of MK, overlapping designated pixel P1 and designated position P1'), so that the second specific range FOV4 of frame CAF becomes a virtual extended screen (that is, the adjusted virtual screen VIM'). The virtual extended screen VIM' and the physical mark MK are simultaneously displayed on the display HDP of the head-mounted display device HMD.

In one embodiment, the position of the designated pixel P1 of the second specific range FOV4 and the designated position P1' of the physical mark MK may be defined in advance.

In one embodiment, when the head-mounted display device HMD does not capture the physical mark MK temporarily (for example, within 5 seconds), the virtual extended screen VIM' can be displayed on the display HDP of the head-mounted display device HMD (for example, temporarily display for 3 seconds).

In one embodiment, the processor 10 adjusts the second specific range FOV4 according to the position information and the rotation information, and regards the adjusted second specific range FOV4 as the virtual extended screen VIM'. The processor 10 knows an extension direction from the physical mark MK (for example, in FIG. 5, the physical mark MK is located on the right side of the physical display PM, and the virtual extended screen VIM' extends to the right side). The processor 10 transmits the extension direction to the head-mounted display device HMD, and the head-mounted display device HMD displays the virtual extended screen VIM' on the display HDP according to the physical mark MK and the extension direction, so that the virtual extended screen VIM' and the physical display PM are displayed side by side.

In one embodiment, the size and resolution of the virtual extended screen VIM' and the physical display PM are the same, and the virtual extended screen VIM' can dynamically display different images.

In one embodiment, the processor 10 crops a field-of-view range FOV0 from the virtual image VIM. And, the processor 10 adjusts the field-of-view range FOV0 to be consistent with the size and resolution of the physical display PM. The processor 10 then regards the adjusted field-of-view range FOV0 as the virtual extended screen VIM', and transmits the virtual extended screen VIM' to the head-mounted display device HMD. The head-mounted display device HMD displays the virtual extended screen VIM' on the display HDP according to the physical mark MK and the extension direction, so that the virtual extended screen VIM' and the physical display PM are displayed side by side.

As shown in FIG. 6, through the augmented reality screen display method 200, as long as the camera CAM of the head-mounted display device HMD captures the physical mark MK, the head-mounted display device HMD transmits the image containing the physical mark MK to the host SR. The host SR can receive the physical mark MK, and the physical mark MK generates a virtual extended screen VIM', and transmits the virtual extended screen VIM' to the display HDP of the head-mounted display device HMD. The user USR can see the physical mark MK through the display HDP and extend the virtual screen VIM'. In one embodiment, as shown in FIG. 6, the user USR can see multiple physical marks MK and a virtual extended screen VIM' corresponding to each physical mark MK by the display HDP. Thus, the virtual extended screens VIM' can be seen on the desktop, wall, and next to the physical display PM.

With the augmented reality screen system and the augmented reality screen display method of the present application, the augmented reality device can scan the physical mark placed at any place or any angle, and the user wearing the augmented reality device can see the virtual extended screen based on the physical mark. The screen size of the virtual extended screen can be adjusted according to the user's requirement, which solves the problems of weight, volume, fixed screen size, space limitation, and inconvenience of portability caused by the use of a physical screen. Therefore, the virtualized display of the extended screen in the augmented reality device can not only replace the physical extended screen, but also create new usage scenarios.

The method of the present invention, or a specific type or part thereof, can exist in the form of code. The code can be contained in physical media, such as floppy disks, CD-ROMs, hard disks, or any other machine-readable (such as computer-readable) storage media, or computer program products that are not limited to external forms. Among them, when the program code is loaded and executed by a machine, such as a computer, the machine becomes a device for participating in the present application. The code can also be transmitted through some transmission media, such as wire or cable, optical fiber, or any transmission type. When the code is received, loaded and executed by a machine, such as a computer, the machine becomes used to participate in this invented device. When implemented in a general-purpose processing unit, the program code combined with the processing unit provides a unique device that operates similar to the application of specific logic circuits.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. An augmented reality screen system, comprising:
   an augmented reality device, configured to take a physical mark through a camera; and
   a host, configured to receive the physical mark, determine position information and rotation information of the physical mark, and fetch a virtual image from a storage device through a processor of the host;
   wherein the processor transmits an adjusted virtual image to the augmented reality device according to the position information and the rotation information, and the augmentation device projects the adjusted virtual image to a display of the augmented reality device, and the adjusted virtual image becomes a virtual extended screen;
   wherein the processor captures a field-of-view (FOV) range in a frame captured by the camera, selects a reference point from the field-of-view range, moves the reference point to a boundary in the frame, captures a first specific range of the field-of-view range in the frame, zooms in the first specific range to match the resolution of a physical display coupled to the host, moves the reference point to target coordinates on the display of the augmented reality device, captures a second specific range of the field of view in the frame, and matches a designated pixel of the second specific range to a designated position of the physical mark, so that the second specific area of the frame becomes the virtual extended screen, and the virtual extended screen and the physical mark are simultaneously displayed on the display of the augmented reality device;
   wherein sizes and resolutions of the virtual extended screen and the physical display are the same.

2. The augmented reality screen system of claim 1, wherein the processor executes a tracking algorithm to detect the position information and the rotation information of the physical mark.

3. The augmented reality screen system of claim 1, wherein the processor uses a position projection algorithm to calculate target coordinates of each pixel of the virtual image projected to the display of the augmented reality device using the position projection algorithm to adjust the virtual image, and projects the adjusted virtual image onto the display of the augmented reality device.

4. The augmented reality screen system of claim 1, wherein the processor adjusts the second specific range according to the position information and the rotation information, and regards the adjusted second specific range as the virtual extended screen, the processor obtains an extension direction from the physical mark, the extension direction is transmitted to the augmented reality device, and the augmented reality device displays the virtual extended screen on the display of the augmented reality device according to the physical mark and the extension direction.

5. An augmented reality screen display method, comprising:
   taking a physical mark through a camera of an augmented reality device;
   receiving the physical mark;
   determining position information and rotation information of the physical mark;
   fetching a virtual image from a storage device through a processor of a host, wherein the processor transmits an adjusted virtual image to the augmented reality device according to the position information and the rotation information, and the augmentation device projects the adjusted virtual image to a display of the augmented reality device, and the adjusted virtual image becomes a virtual extended screen;
   capturing a field-of-view (FOV) range in a frame captured by the camera;
   selecting a reference point from the field-of-view range;
   moving the reference point to a boundary in the frame;
   capturing a first specific range of the field-of-view range in the frame;
   zooming in the first specific range to match the resolution of a physical display coupled to the host, and moving the reference point to target coordinates on the display of the augmented reality device;
   capturing a second specific range of the field of view in the frame;
   matching a designated pixel of the second specific range to a designated position of the physical mark, so that the second specific area of the frame becomes the virtual extended screen; and
   displaying the virtual extended screen and the physical mark simultaneously on the display of the augmented reality device;
   wherein sizes and resolutions of the virtual extended screen and the physical display are the same.

6. The augmented reality screen display method of claim 5, further comprising:
   executing a tracking algorithm to detect the position information and the rotation information of the physical mark.

7. The augmented reality screen display method of claim 5, further comprising:
   calculating target coordinates of each pixel of the virtual image projected to the display of the augmented reality device using the position projection algorithm to adjust the virtual image, and projecting the adjusted virtual image onto the display of the augmented reality device.

8. The augmented reality screen display method of claim 5, further comprising:
   adjusting the second specific range according to the position information and the rotation information, and regarding the adjusted second specific range as the virtual extended screen;
   obtaining an extension direction from the physical mark; and
   displaying the virtual extended screen on the display of the augmented reality device according to the physical mark and the extension direction.

* * * * *